(12) United States Patent
Unnold et al.

(10) Patent No.: US 11,295,599 B1
(45) Date of Patent: Apr. 5, 2022

(54) EVENT DRIVEN CONDITIONAL REMINDER SYSTEM

(71) Applicants: Christine Lee Unnold, Stamford, CT (US); Robert Mathias Unnold, Stamford, CT (US)

(72) Inventors: Christine Lee Unnold, Stamford, CT (US); Robert Mathias Unnold, Stamford, CT (US)

(73) Assignee: Did U Remember to LLC, Stamford, CT (US)

( * ) Notice: Subject to any disclaimer, the term of this patent is extended or adjusted under 35 U.S.C. 154(b) by 0 days.

(21) Appl. No.: 17/515,040

(22) Filed: Oct. 29, 2021

Related U.S. Application Data

(63) Continuation of application No. 16/534,924, filed on Aug. 7, 2019, now Pat. No. 11,189,156.

(60) Provisional application No. 62/791,002, filed on Jan. 10, 2019.

(51) Int. Cl.
*G08B 21/24* (2006.01)
*H04W 4/02* (2018.01)
*H04W 4/80* (2018.01)

(52) U.S. Cl.
CPC ........... *G08B 21/24* (2013.01); *H04W 4/023* (2013.01); *H04W 4/80* (2018.02)

(58) Field of Classification Search
CPC ......... G08B 21/24; H04W 4/023; H04W 4/80
See application file for complete search history.

(56) References Cited

U.S. PATENT DOCUMENTS

| | | | |
|---|---|---|---|
| 2013/0237193 A1* | 9/2013 | Dumas | G07C 9/00571 455/414.1 |
| 2016/0049025 A1* | 2/2016 | Johnson | H04W 4/029 340/5.61 |
| 2018/0348718 A1* | 12/2018 | Richardson | H04L 12/2829 |

* cited by examiner

*Primary Examiner* — James J Yang
(74) *Attorney, Agent, or Firm* — Wiggin and Dana LLP; Gregory S. Rosenblatt; Thomas M. Landman

(57) ABSTRACT

An apparatus, system, and method for creating, controlling, and generating event driven customized reminders associated with precise indoor or outdoor locations using one or more small base units, such as a transmitter or beacon, at the desired locations, continual or continuous or movement triggered Short Range Communication (SRC), and software running on a mobile device, such as a mobile phone are described herein. When the mobile device comes within communication range of any base unit employing SRC, e.g., located by the back door or office door, or when the mobile device comes within SRC of any base unit that is triggered by movement of said base unit, where said base unit is mounted on a door, employing an accelerometer and SRC, the system generates a conditional and predefined, by the user, alert and or message on the mobile device and or on the base unit.

5 Claims, 6 Drawing Sheets

EVENT DRIVEN CONDITIONAL REMINDER SYSTEM

CROSS-REFERENCE TO RELATED APPLICATIONS

This application is a continuation of U.S. patent application Ser. No. 16/534,924, entitled "EVENT DRIVEN CONDITIONAL REMINDER SYSTEM", filed 7 Aug. 2019, which claims the benefit under 35 U.S.C. § 119(e) of U.S. Provisional Application No. 62/791,002, entitled "DID-U-REMEMBER-TO", filed 10 Jan. 2019, all of which are herein incorporated by reference in their entireties.

BACKGROUND

Daily life requires many people to travel to and from various locations. In the course of starting and ending these travels, people frequently forget something. People often forget items that they intended to bring with them or actions they wanted to take upon leaving or returning during specific time frames or days or other conditions. Examples are bringing their coffee mugs, baseball mitts, or laptop computers when they leave home weekday mornings, or just tomorrow morning, and upon returning home turning on the oven to warm it up to cook dinner, feeding the fish, performing any of a wide variety of lesser and greater important actions, or remembering any of a wide variety of lesser and greater items. Forgetting such items can have a significant impact on a person's day, frequently resulting in lost time, productivity, comfort, and opportunities.

Mobile phones, tablets, and other mobile electronic devices using a variety of software applications typically provide the user with notifications, alerts, and reminders based on certain predetermined conditions, e.g., time, GPS location, and other processed data. In these conventional systems the application monitors the predetermined conditions and provides a visual or sound notification to the user when the condition is met. Descriptions of some conventional systems follow.

U.S. Pat. No. 10,171,941, titled "Information processing apparatus, information processing method, program and information processing system" which issued Jan. 1, 2019, names Masano, et al. as the inventors and discloses an information processing apparatus including an existing place information acquisition part and a my-spot information registration part.

U.S. Pat. No. 10,163,318, titled "Comprehensive system and method of universal real-time linking of real objects to a machine, network, internet, or software service", which issued Dec. 25, 2018, names Kazerouni as the inventor and discloses methods of connecting or linking real objects to machines or the virtual world in real time utilizing a device are disclosed. In one embodiment, a wireless tag attached to an object in communication with an electronic device, such as a cellular phone, tablet computer, laptop computer, or watch, monitors and updates the position of a wireless tag locally and on a machine/network/cloud.

U.S. Pat. No. 10,103,786, titled "System and Method for Close Proximity Communication", which issued on Oct. 16, 2018, names Dobyns as the inventor and discloses a method of detecting signals transmitted by close proximity communications devices.

U.S. Pat. No. 10,084,512, titled "Proximity Boundary Based Communication", which issued on Sep. 25, 2018, names Dobyns and Abrams as the inventors and discloses devices and systems for short-ranged proximity boundary communication.

U.S. Pat. No. 9,525,969, titled "Selection of location information based on detected movement", which issued Dec. 20,2016, names Evans, et al, as the inventors and discloses movement information describing a movement of a tracking device is received at a mobile device. The mobile device determines a location associated with the tracking device, and provides the determined location, an identity of the tracking device, and the received movement information to a tracking server.

U.S. Pat. No. 7,502,619, titled "Location determination of low power wireless devices over a wide area", which issued Mar. 10, 2009, names Katz as the inventor and discloses a method and system for location determination of low power wireless devices, over a wide area, where the communication device is a Bluetooth enabled mobile/cellular phone and the sensor detects radiation emitted by the mobile device on non-Bluetooth bands.

U.S. Patent Application Publication No. 20100164715, titled "System, Method and Network for Monitoring of Location of Items", which published Jul. 1, 2010, names Buller, et al. as the inventors and discloses a network for monitoring of location of items, including a plurality of wireless devices, where each of the plurality of wireless devices is associated with a monitored item. Each of a plurality of mobile stations are associated with a respective user and configured to generate an alert when at least one respective wireless device of the plurality of wireless devices exceeds a location parameter. A processing system is in communication with the plurality of mobile stations, and the processing system includes a database that collects and stores data related to the plurality of wireless devices and the plurality of mobile stations.

U.S. Patent Application Publication No. 20080172173, titled "Location Mapping For Key-point Based Services", which published Jul. 17, 2008, names Chang et al. as the inventors and discloses a Proxi-Mapper which automatically determines approximate locations of one or more local user devices (cell phones, PDA's, media players, portable computing devices, etc.) and returns a lightweight model of local entities ("key-points") representing businesses, services or people to those devices. User query options allow the Proxi-Mapper to pull or push relevant local key-point based information to user devices via one or more wired or wireless networks.

U.S. Patent Application Publication No. 20040198389, titled "A method and system for delivering location specific information," which published Oct. 7, 2004, names Alcock et al. as the inventors and discloses a method and system for delivering location specific information to a receiver without the receiver having to transmit its location. The method includes self-determining a location of a receiver and receiving a signal comprising information pertaining to a wide geographical area.

Thus, there is a need to provide an easy to use system that provides event driven conditional reminders to help minimize the likelihood that a person forgets an item or to take some action. Further, there is a need to utilize proximity-based detection and/or motion detection as an event to ensure that reminders are generated in the proper context and in a timely manner to be useful to a person seeking to minimize their likelihood of forgetting an item or an action.

Embodiments of the invention address these and other problems.

BRIEF SUMMARY

This invention relates generally to an apparatus, system, and method for reminding the user about something when user defined conditions are met, with no manual intervention, when simultaneously in very close proximity to a user designated location. Examples of locations include, among other places, the user's house back door, office door, or apartment door. Examples of user defined conditions include, among other conditions: a time frame (e.g., 7:00 to 8:00 AM weekdays); a weather status (e.g., rain); and a combination of time frame and weather status (e.g., rain is forecast within the next twelve hours). The reminders may be statements like bring your coffee mug or bring an umbrella. Furthermore, the user defined conditions may be based on, information which includes, among other content, static and changing content of: a calendar maintained on a mobile device or other electronic sources; a third party public database; a private database: and user defined content. Examples of content include, among other content: daily pollen (e.g., high pollen count today); financial data (e.g., DJIA up 100 points); sports scores (e.g., the Mets won last night); UV index (e.g., today is a high sunburn risk day); and private employer database (e.g., inventory hit critical low level overnight), The reminders may be statements including: bring extra allergy meds; call my broker on the drive to work; needle the coffee counter guy who is a Yankees fan; don't forget the suntan lotion; and stop at the warehouse on the way home. User defined conditions include both single conditions and multiple conditions either alone or in combination.

One or more embodiments of the present invention relate to an apparatus for generating reminders, which includes a base unit, e.g., a transmitter, or beacon, that may communicate with a mobile device, e.g., mobile phone, and its software, which together can be used in a method for providing timely, conditional, reliable, and point specific reminders. Such reminders or notifications are automatically generated when the system is triggered by communication from the base unit. The base unit communication is initiated by the mobile device proximity to or movement of the base unit, where the mobile device is near or passing the base unit and user determined conditions of reminder are met. Another embodiment of the present invention relates to a method of using such an apparatus.

One or more embodiments of the present invention relate to a system for generating conditional reminders based on the occurrence of an event. Such a system may use a base unit, e.g., a transmitter or beacon, that may communicate with a mobile device, e.g., mobile phone, and its software, which together can be used in a method for providing timely, conditional, reliable, and point specific reminders to generate such reminders. Such reminders or notifications are automatically generated when the system is triggered by communication from the base unit. The base unit communication is initiated by the mobile device proximity to or movement of the base unit, where the mobile device is near or passing the base unit and user determined conditions of reminder are met.

These and other embodiments are described in further detail below. Additional features and advantages of the present invention will be set forth as follows, and will be clear from the description, or may be learned by the practice of the disclosures that follow.

BRIEF DESCRIPTION OF THE DRAWINGS

The accompanying figures illustrate the apparatus, systems, and methods for implementing the event driven conditional reminder system of the present invention.

DETAILED DESCRIPTION

The terminology used herein is for the purpose of describing particular embodiments only and is not intended to be limiting of the invention. As used herein, the term Short Range Communication (SRC), such as Near Field Communication (NFC) 102 or Bluetooth Low Energy Communication (BLEC) 112 or comparable communications is used to describe the wireless connection between a base unit 101, 111 and a mobile device 103, 113.

Mobile devices are well known technology. A mobile device is typically small enough for a person to carry with them. Examples of mobile devices include, phone, tablet, watch, computers and other personal use wireless devices.

Figure 1:
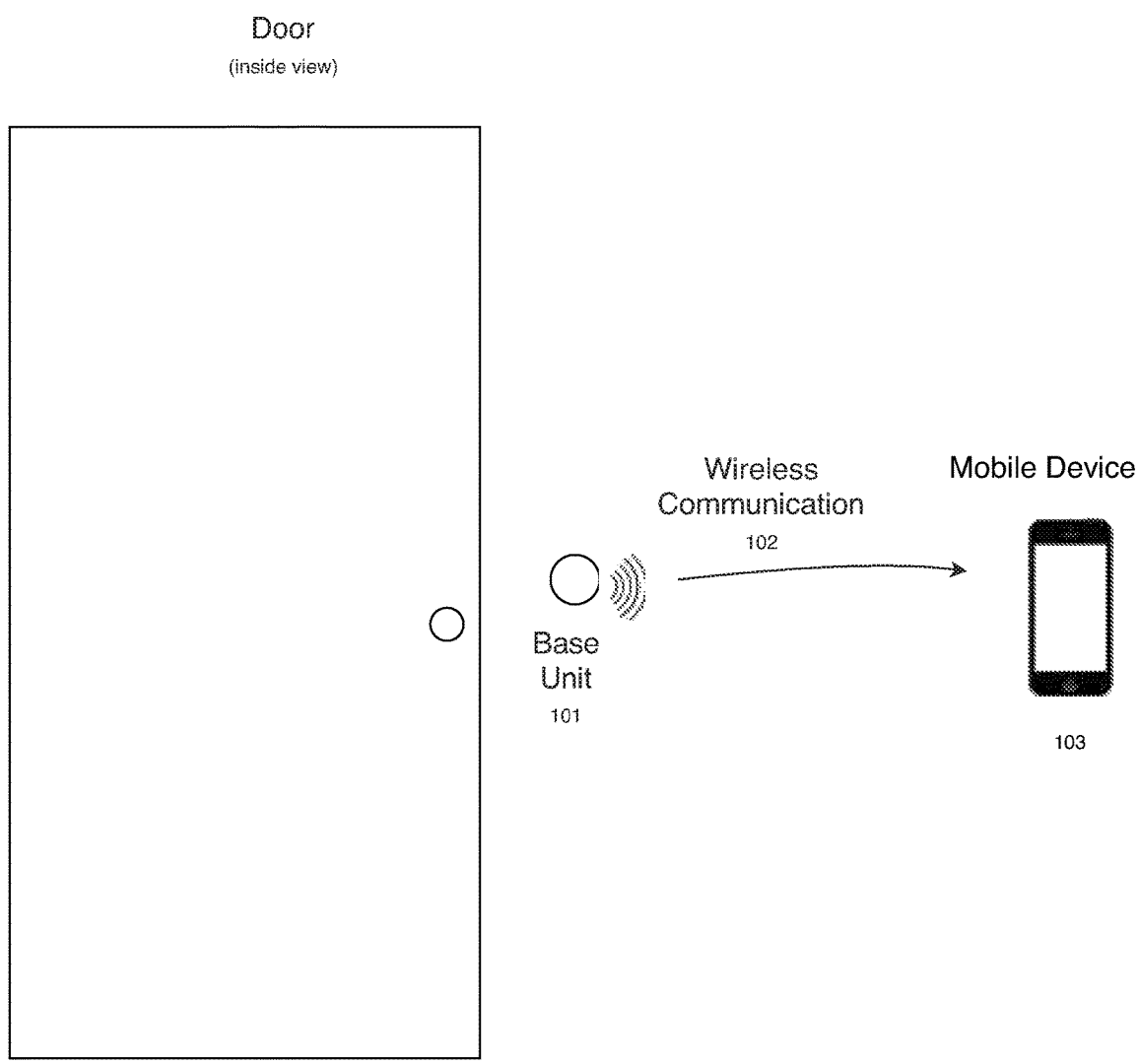
FIGS. 1 and 3 are diagrams of the base unit, communication, and mobile device systems in accordance with embodiments of the present invention.
Figure 2:
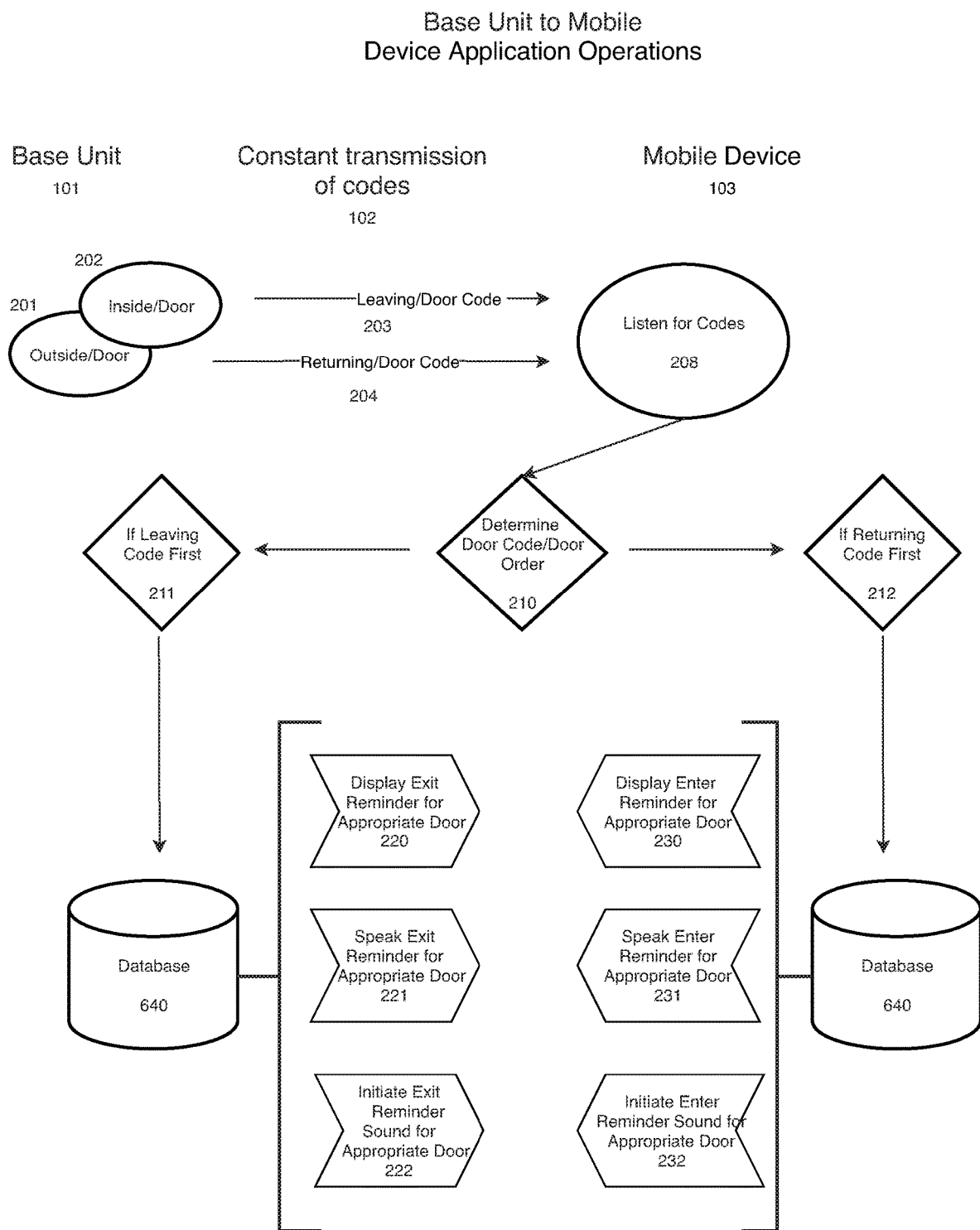
FIGS. 2 and 4 are flow charts illustrating methods of monitoring wireless signals from a base unit, such as a transmitter or beacon, to a mobile device, such as a mobile phone, and initiating a reminder in accordance with an embodiment of the present invention.
Figure 3:
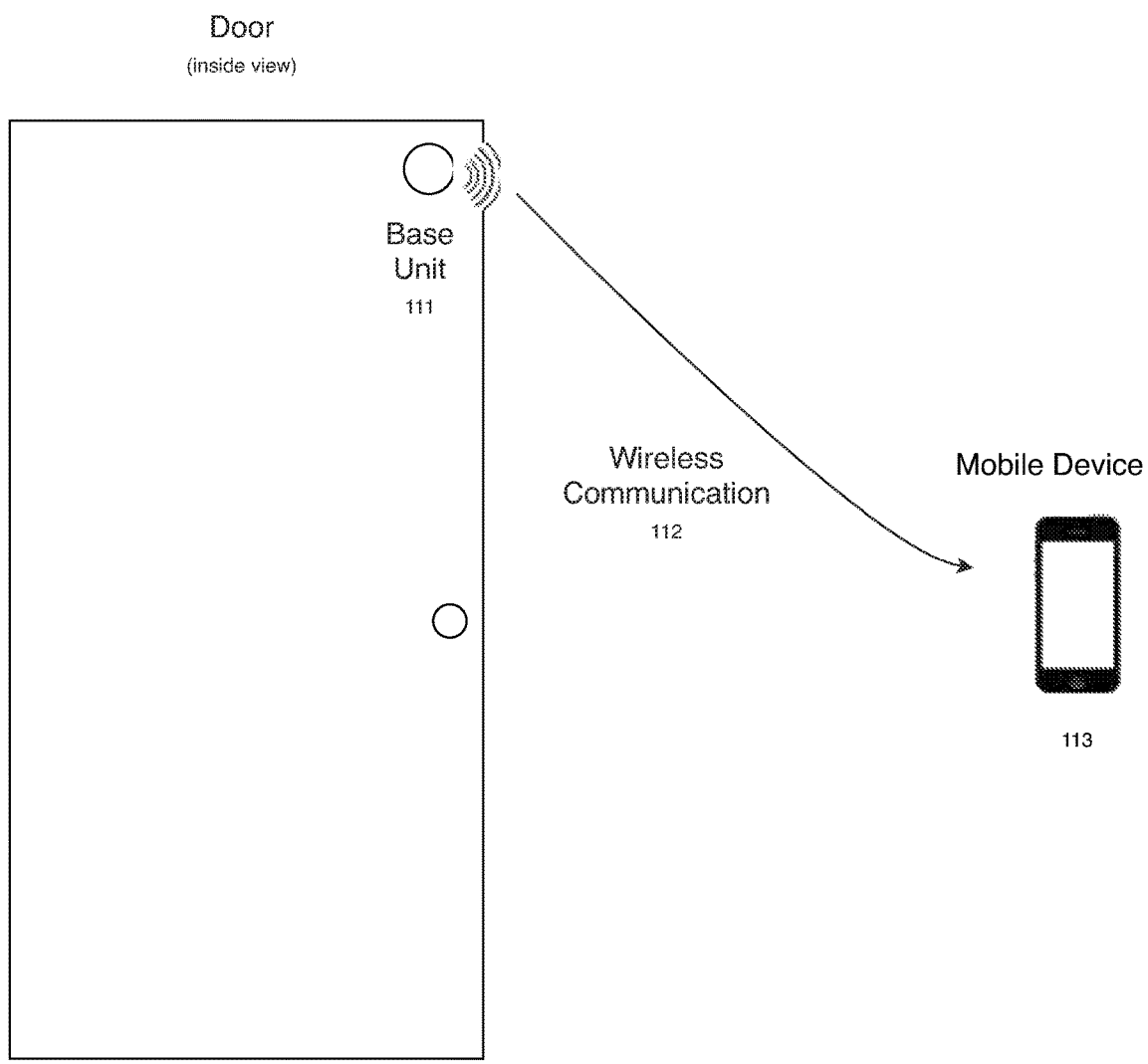
Figure 4:
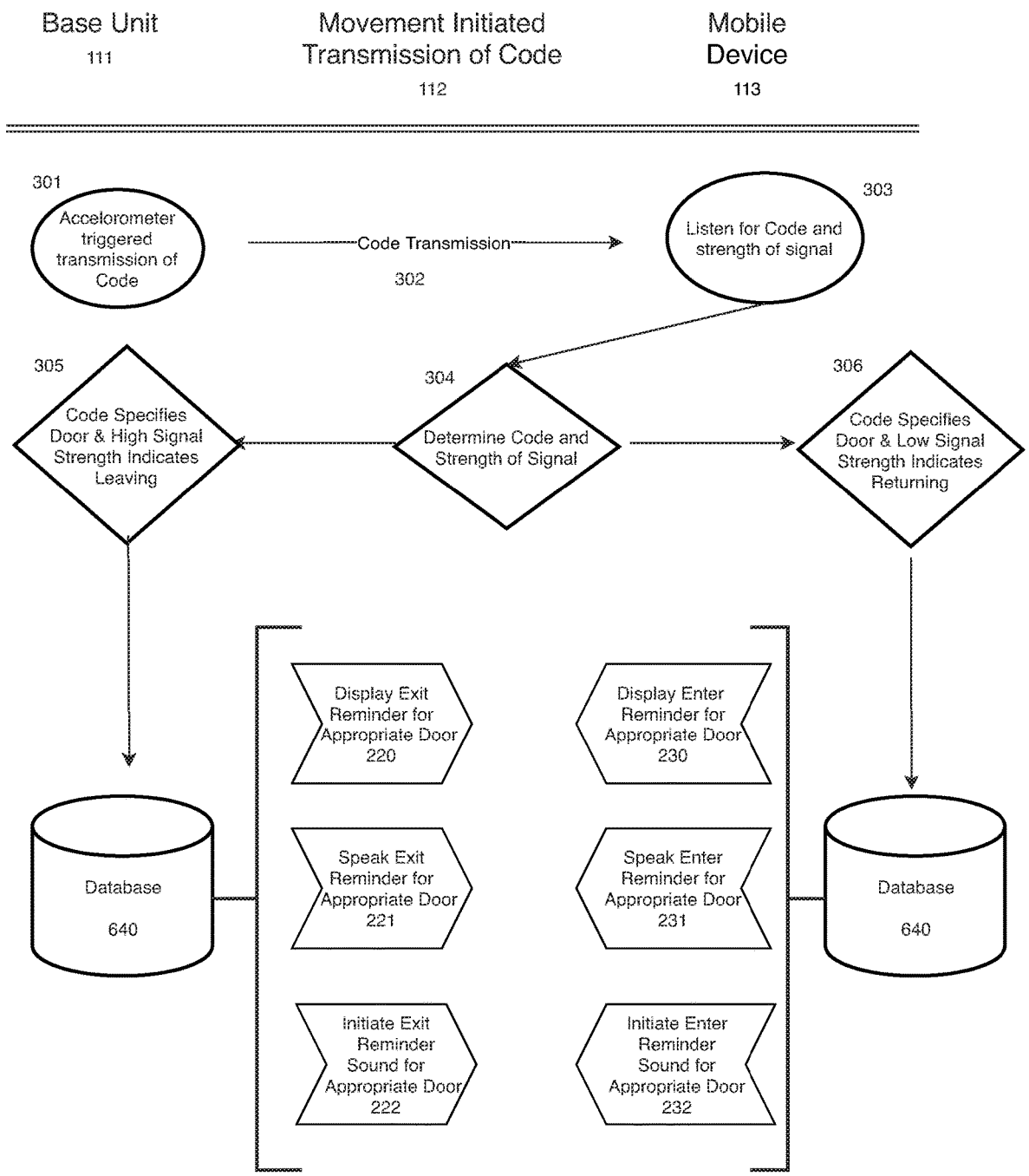
Figure 5:
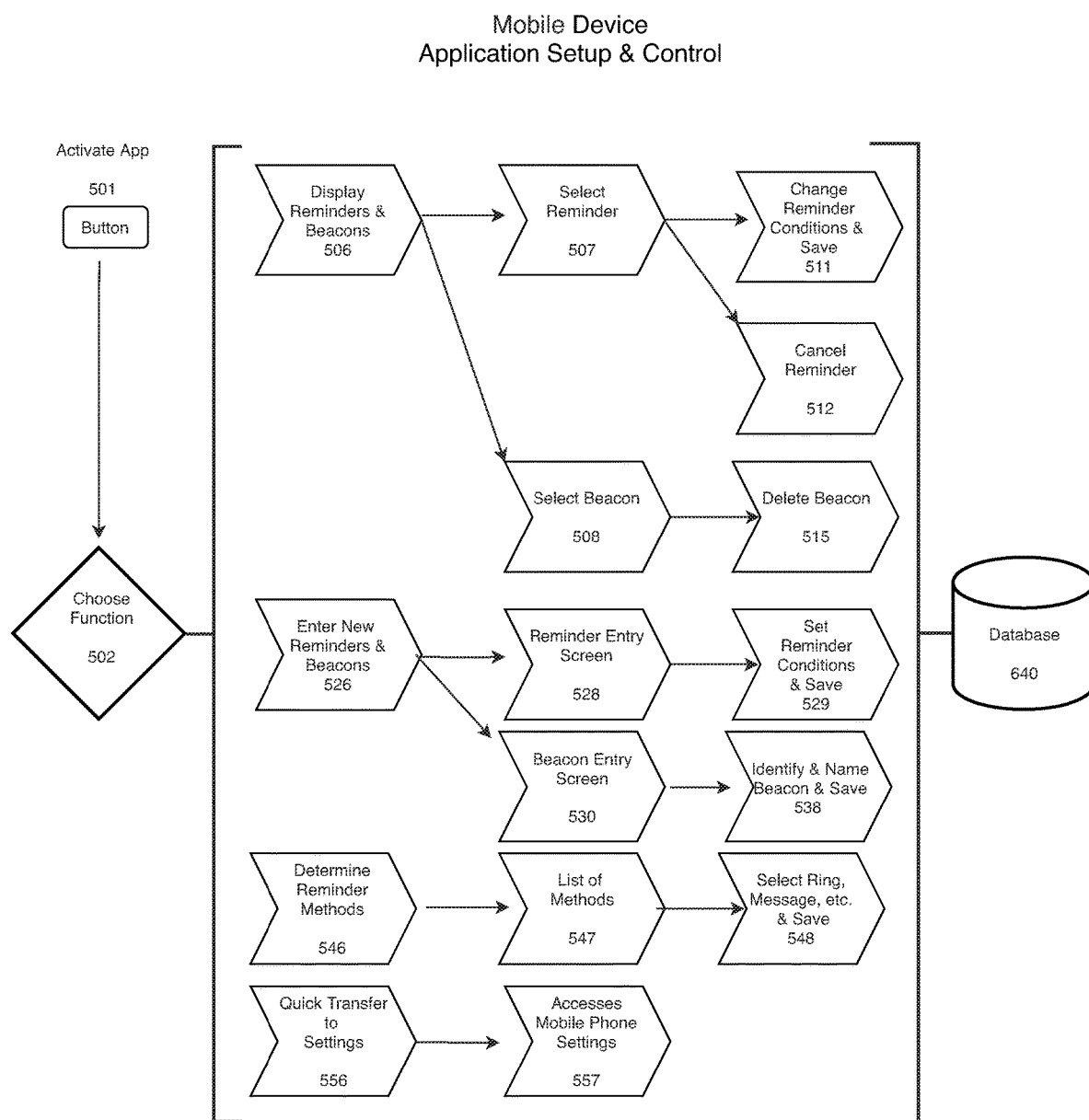
FIG. 5 is a flow chart illustrating a method of entering, updating, and deleting data for reminders, and other functions, in accordance with an embodiment of the present invention.
Figure 6:
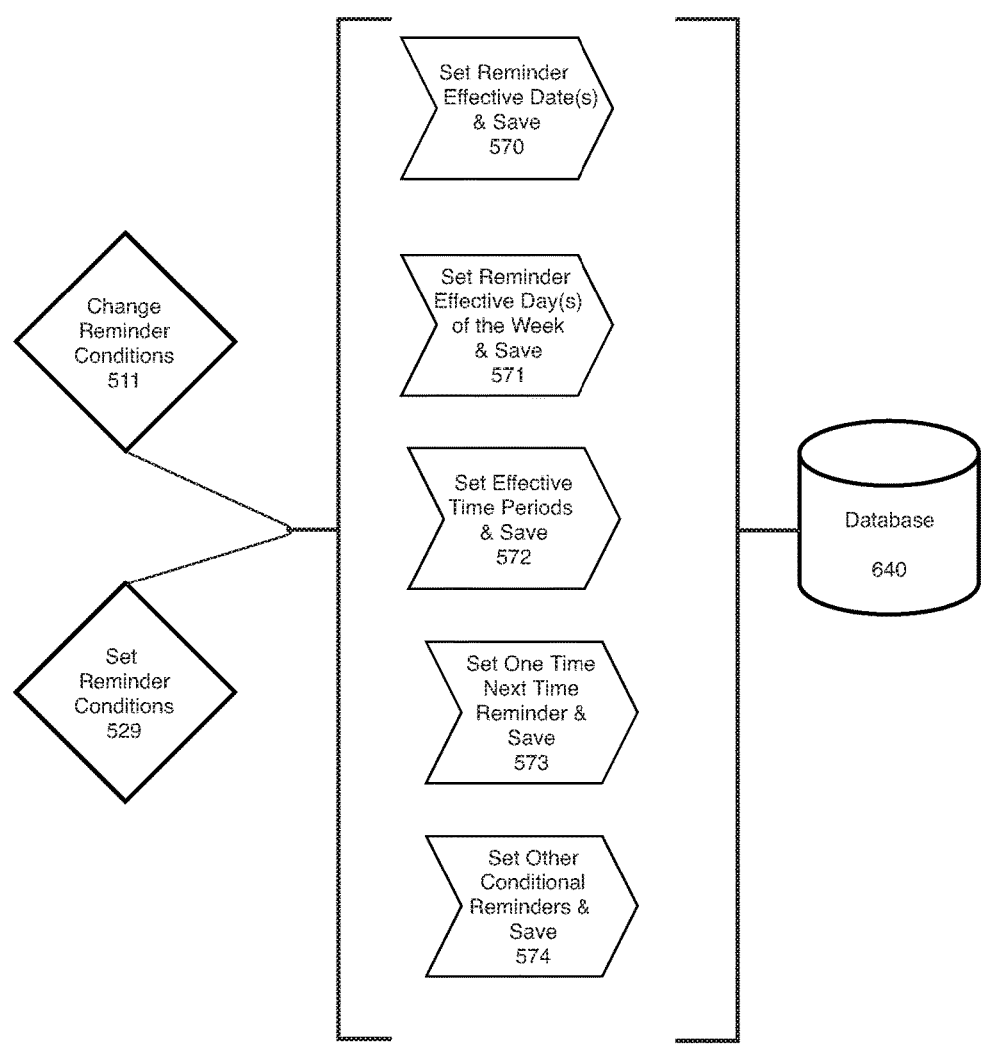
FIG. 6 is a flow chart illustrating a method of choosing a base unit and setting reminder conditions in accordance with an embodiment of the present invention.

FIGS. 1 through 6, discussed below, and the various embodiments used to describe the principles of the present disclosure in this patent document are by way of illustration only and should not be construed to in any way limit the scope of the disclosures. Those skilled in the art will understand that the principles of the present disclosure may be implemented in any suitably arranged system or device.

In an embodiment of the invention a small base unit 101, 111, comprises a battery, circuit boards including functionality such as a small CPU and an accelerometer, antenna, and SRC 102, 112, which may be placed on a door frame, table or window sill near the door, or on a door or similar point specific moveable item. The base unit 101, 111, such as a transmitter or beacon, may be placed or secured by ordinary means where the user, when in its proximity wants to be reminded of something, such as a task to do or an item to bring, via their mobile device 103, 113, such as a mobile phone by an event, e.g., when leaving or entering a home, garage, warehouse, storage facility, or office.

The base unit, 101, provides for wireless communication, 102, and is continually or continuously transmitting data, 201-208, such as a coded signal, for the mobile device 103, to receive.

The base unit, 111, includes a trigger mechanism, such as an accelerometer, which is used to start the wireless communication, 112, for a brief period of time, sufficient for the mobile device, 113, to receive the transmission data, 301-303, such as a coded signal, when door movement is detected by the accelerometer.

The base unit, 101, 111, may include software that can be used to receive, using SRC 102, 112, process, and store instructions from a mobile device 103, 113, and may include a speaker that can be used to broadcast a reminder(s).

The base unit 101, 111, may include a green LED and/or a red LED to indicate the base unit 101, 111, is working (green), to indicated the base unit 101, 111 is communicating 102, 112, with a mobile device 103, 113, (flashing green), or is in need of a fresh battery or a recharge (red) in the case of a rechargeable battery being employed. In such cases the base unit 101, 111, may include a removable cover to access the battery in a standard fashion utilized today. The base unit 101, 111, may be one where a permanently sealed battery is employed.

In an embodiment of the invention, mobile device software 208-640, employs existing SRC capabilities of the mobile device 208, 303, to listen for a signal(s) from the base unit, 101, 111. The mobile device software 208-640, allows the user to custom enter 501, 502, 526, 528, 529, 570-574, change 501, 502, 506, 507, 511, 570-574, and cancel 501, 502, 506, 507, 512 a reminder(s) 220-232. Such reminder(s) 220-232, may include static conditions such as time of day 572, 573, 574, constraints, expiration dates/times 570, 572, 573, 574, active only on certain days of the week 571, and/or dynamic conditions 574, including but not limited to today's weather and pollen count, that are triggered creating a reminder(s) when in proximity to the base unit 101, 111, e.g., "bring the shopping list", "turn the lights off", "turn the oven on to 450 degrees", "are confidential papers put away", "walk the neighbor's dog", "bring an umbrella", etc. The mobile device software 208-640, allows the user to automatically identify and then name 501, 502, 526, 530, 538, the base unit 101, 111, e.g., back door, office door, apartment door, etc.

The mobile device software 208-640 may generate reminders in the form of text 220, 230, including but not limited to text messages and dialog boxes, audio 221, 231, including but not limited to the reminder statement, or sound 222, 232 when they pass a particular point, the base unit 101, 111, as in leaving or entering the house, apartment, garage, office, etc. Said reminders may be transmitted from the base unit 101, 111, a mobile device 103, 113, or both.

The base unit 101, 111 power level may be used by the mobile device software 201-212, 303-306, so as to actively determine whether the user is leaving 305, (higher level of power) or returning 306, (lower level of power) when the base unit 101, 111, is mounted on the inside of the door. One feature provided by the embodiment of the present invention is the use of two base units 101, 111, with directional transmissions wave propagation, one mounted on the inside of the door and other on the outside of the door, so as to actively determine whether the user is leaving or returning.

What we claim is:

1. A method of generating a directional conditional reminder comprising:
    mounting a first Bluetooth beacon on a first side of a movable element, the first Bluetooth beacon comprising an accelerometer and configured to transmit a first trigger signal when the accelerometer senses movement;
    installing a software application on a mobile device including a Bluetooth receiver and at least one of a display and a sound generating means;
    prompting a user to enter a reminder on the mobile device comprising a user-defined custom content and a first direction of approach of the mobile device toward the movable element;
    receiving the trigger signal at the mobile device;
    determining whether the mobile device has approached the movable element in the preset direction of approach based on a power level of the trigger signal received at the mobile device, wherein the power level of the trigger signal received when the mobile device and the Bluetooth beacon are on a same side of the movable element is greater than the power level of the trigger signal received when the mobile device and the Bluetooth beacon are on different sides of the movable element; and
    presenting the reminder on the mobile device if the determined direction of approach matches the first direction of approach toward the movable element.

2. The method of claim 1, further comprising:
    mounting a second Bluetooth beacon on a second side of the movable element, the second Bluetooth beacon comprising a second accelerometer and configured to transmit a second trigger signal when the second accelerometer senses movement;
    prompting the user to enter a second direction of approach of the mobile device toward the movable element;
    receiving the first and second trigger signals at the mobile device;
    determining whether the mobile device has approached the movable element in the first or second direction of approach based on the respective power level, a higher power level between the first and second trigger signals distinguishing the actual direction of approach toward the movable element; and
    presenting the reminder on the mobile device if the determined direction of approach matches the second direction of approach toward the movable element.

3. The method of claim 1, wherein the user-defined custom content comprises a text string, an audio file, a video file, or an audio-video file, or an alert.

4. A method of generating a directional conditional reminder comprising:
    mounting a Bluetooth beacon on a movable element, the Bluetooth beacon comprising an accelerometer capable of sensing motion in one or more directions, wherein moving the element causes the Bluetooth beacon to transmit a trigger signal comprising identifying information of the beacon and direction of movement information of the movable element when motion is sensed by the accelerometer;
    installing a software application on a mobile device including a Bluetooth receiver and at least one of a display and a sound generating means;
    prompting a user to enter a reminder on the mobile device comprising:
        a user-defined custom content; and
        identifying information of the beacon and direction of movement information of the movable element;
    receiving the trigger signal at the mobile device; and
    presenting the reminder on the mobile device if the received identifying information of the beacon and direction of movement information match the preset identifying information of the beacon and direction of movement information of the movable element.

5. The method of claim 4, wherein the user-defined custom content comprises a text string, an audio file, a video file, or an audio-video file, or an alert.

* * * * *